(12) United States Patent
Ono et al.

(10) Patent No.: US 9,539,730 B2
(45) Date of Patent: Jan. 10, 2017

(54) HOLDING APPARATUS FOR FUEL CELL ELECTROLYTE MEMBRANE

(71) Applicant: NISSAN MOTOR CO., LTD., Yokohama-shi, Kanagawa (JP)

(72) Inventors: Kei Ono, Yokohama (JP); Norifumi Horibe, Fujisawa (JP); Masaya Yamamoto, Yokosuka (JP); Kenichi Toyoshima, Yokohama (JP); Takayuki Terasaki, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/413,144

(22) PCT Filed: Jun. 24, 2013

(86) PCT No.: PCT/JP2013/067275
§ 371 (c)(1),
(2) Date: Jan. 6, 2015

(87) PCT Pub. No.: WO2014/010398
PCT Pub. Date: Jan. 16, 2014

(65) Prior Publication Data
US 2015/0165627 A1    Jun. 18, 2015

(30) Foreign Application Priority Data
Jul. 10, 2012 (JP) .................. 2012-154958

(51) Int. Cl.
*B25J 15/06* (2006.01)
*H01M 8/00* (2016.01)
(Continued)

(52) U.S. Cl.
CPC ............. *B25J 15/0616* (2013.01); *B65H 5/14* (2013.01); *H01M 8/006* (2013.01);
(Continued)

(58) Field of Classification Search
CPC ...... B25J 15/0616; B25J 15/0683; B65H 3/00; B65H 3/0883; B65H 5/222; B65H 5/14; H01M 8/006; H01M 8/0273; H01M 2008/1095; Y02P 70/56; Y02E 60/50; Y02E 60/523
(Continued)

(56) References Cited

U.S. PATENT DOCUMENTS 3,467,430 A * 9/1969 Lowe ............................. 294/65
4,559,718 A * 12/1985 Tadokoro ....................... 34/317
(Continued)

FOREIGN PATENT DOCUMENTS

DE     102010025885 A1    1/2012
JP        2002370245 A    12/2002
(Continued)

*Primary Examiner* — Dean Kramer
(74) *Attorney, Agent, or Firm* — Young Basile Hanlon & MacFarlane, P.C.

(57) ABSTRACT

A holding apparatus for a fuel cell electrolyte membrane includes a support having a flat surface part which supports an electrolyte membrane on which catalyst layers are disposed, and which constitutes a membrane electrode assembly. The flat surface part has a frame-shaped recess positioned outside an outer circumference of the catalyst layers, and the recess is connected to an air-sucking section, and attracts the electrolyte membrane by sucking air in the recess.

11 Claims, 6 Drawing Sheets

(51) Int. Cl.
*H01M 8/02* (2016.01)
*B65H 5/14* (2006.01)
*H01M 8/10* (2016.01)

(52) U.S. Cl.
CPC .. *H01M 8/0273* (2013.01); *H01M 2008/1095* (2013.01); *Y02E 60/50* (2013.01); *Y02E 60/523* (2013.01); *Y02P 70/56* (2015.11)

(58) Field of Classification Search
USPC .............................. 294/183, 185, 65; 901/40
See application file for complete search history.

(56) References Cited

U.S. PATENT DOCUMENTS

| | | | | |
|---|---|---|---|---|
| 5,018,936 | A * | 5/1991 | Izumi et al. | 198/395 |
| 5,033,783 | A * | 7/1991 | Izumi et al. | 294/185 |
| 5,324,087 | A * | 6/1994 | Shimose et al. | 294/185 |
| 6,032,997 | A * | 3/2000 | Elliott et al. | 279/3 |
| 6,341,808 | B1 * | 1/2002 | Baan et al. | 294/186 |
| 6,538,733 | B2 * | 3/2003 | Gaal et al. | 356/244 |
| 6,749,713 | B2 | 6/2004 | Mlinar | |
| 6,756,146 | B2 | 6/2004 | Mlinar et al. | |
| 7,601,388 | B2 | 10/2009 | Puffer et al. | |
| 2003/0038491 | A1 * | 2/2003 | Schmalz et al. | 294/64.1 |
| 2010/0024957 | A1 | 2/2010 | Puffer et al. | |

FOREIGN PATENT DOCUMENTS

| | | | |
|---|---|---|---|
| JP | 2004235089 A | 8/2004 | |
| JP | 2010238655 A | 10/2010 | |

\* cited by examiner

HOLDING APPARATUS FOR FUEL CELL ELECTROLYTE MEMBRANE

CROSS REFERENCE TO RELATED APPLICATION

The present application claims priority to Japanese Patent Application No. 2012-154958, filed Jul. 10, 2012, incorporated herein in its entirety.

TECHNICAL FIELD

The present invention relates to a holding apparatus for fuel cell electrolyte membrane.

BACKGROUND

A membrane electrode assembly (MEA) included in a unit cell of a fuel cell has an electrolyte membrane, a catalyst layer, a gas diffusion layer, and a frame-shaped gasket. The gasket is disposed (stacked) on both surfaces of the electrolyte membrane, positioned to surround the catalyst layer, and thus functions to prevent a fuel gas and an oxidizer gas supplied to the catalyst layer from leaking externally.

At the time of handling the electrolyte membrane, the electrolyte membrane is attracted to a support in which many attracting holes are formed, and thus formation of wrinkles in the electrolyte membrane is prevented (for example, see Publication of unexamined Japanese Patent Application No. 2010-238655).

SUMMARY

However, there is a concern that since the catalyst layer is disposed on the electrolyte membrane, contamination occurs as a result of sucking catalyst particles detached from the catalyst layer, and clogging occurs in many attracting holes at the time of attracting the electrolyte membrane. As a result, there is a problem that production efficiency is reduced.

The present invention has been made to solve the aforementioned problem in the prior art, and aims to provide a holding apparatus for fuel cell electrolyte membrane capable of having high production efficiency.

The present invention to achieve the object is a holding apparatus for fuel cell electrolyte membrane including a support having a flat surface part which supports an electrolyte membrane on which a catalyst layer is disposed, and which constitutes a membrane electrode assembly. The flat surface part has a frame-shaped recess positioned outside an outer circumference of the catalyst layer, and the recess is connected to an air-sucking section, and attracts the electrolyte membrane by sucking air in the recess.

According to the present invention, the electrolyte membrane is attracted to the recess disposed on the flat surface part of the support, and thus formation of wrinkles in the electrolyte membrane is prevented. Further, since the recess is in a frame shape and positioned outside the outer circumference of the catalyst layer, the catalyst layer is not directly sucked, and it is possible to suppress the occurrence of clogging, and to suppress a reduction in production efficiency. Accordingly, it is possible to provide a holding apparatus for fuel cell electrolyte membrane capable of having high production efficiency.

The objects, features, and characteristics of this invention other than those set forth above will become apparent from the description given herein below with reference to preferred embodiments illustrated in the accompanying drawings.

DETAILED DESCRIPTION OF THE EMBODIMENTS

Hereinafter, the embodiment of the present invention will be described with reference to the drawings.

Figure 1:
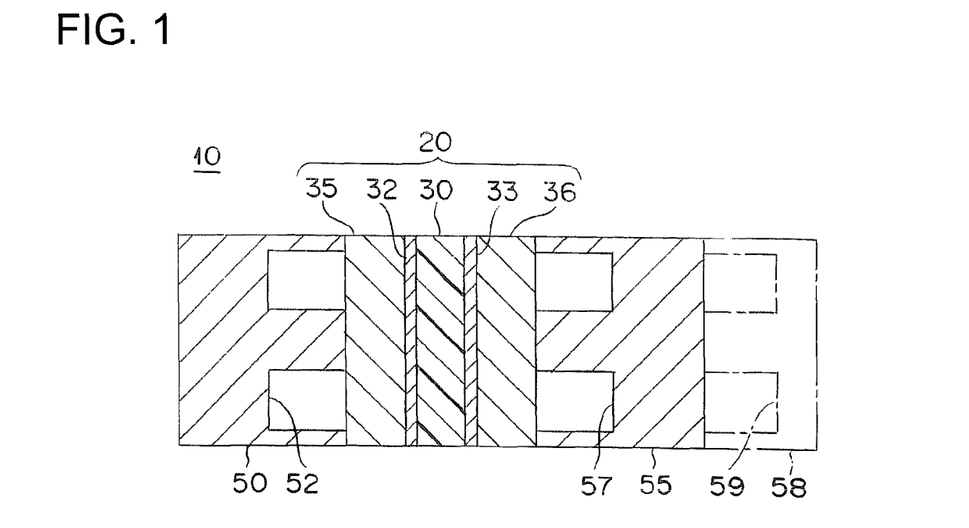
FIG. 1 is a cross-sectional view illustrating a cell structure of a fuel cell according to an embodiment of the present invention.
Figure 2:
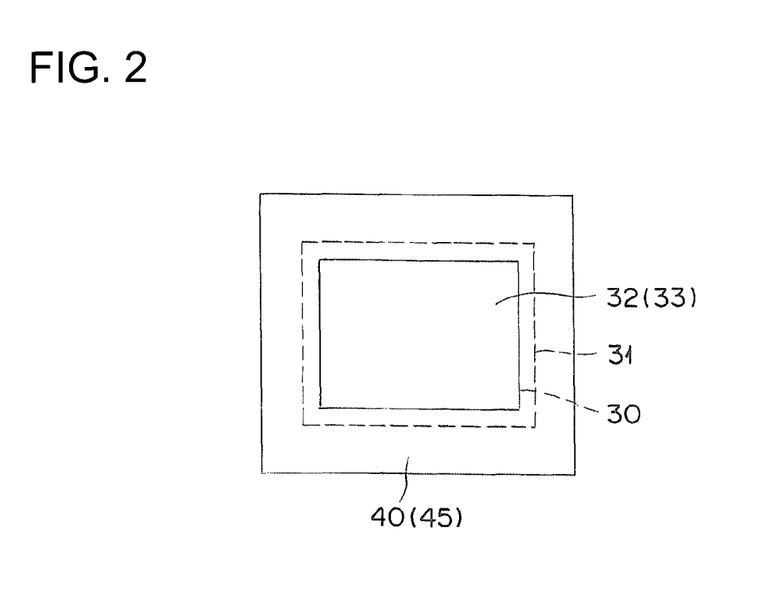
FIG. 2 is a plan view illustrating a gasket disposed on both surfaces of an outer circumference portion of a membrane electrode assembly shown in FIG. 1.

FIG. 1 is a cross-sectional view illustrating a cell structure of a fuel cell according to an embodiment of the present invention, and FIG. 2 is a plan view illustrating a gasket disposed on both surfaces of an outer circumference portion of a membrane electrode assembly shown in FIG. 1.

A unit cell 10 shown in FIG. 1 is applied to, for example, a polymer electrolyte fuel cell (PEFC) which uses hydrogen as a fuel, and includes a membrane electrode assembly 20 and separators 50 and 55. The unit cell 10 further includes a cooling panel 58 in a case where the unit cells 10 are stacked to be used, and a recess 59 provided in the cooling panel 58 constitutes a coolant passage through which the coolant flows to cool the unit cell 10.

The membrane electrode assembly 20 includes a polymer electrolyte membrane 30, catalyst layers 32 and 33, gas diffusion layers (GDL) 35 and 36, and gaskets 40 and 45.

The catalyst layer 32 includes a catalyst component, electrically conductive catalyst carriers which carry the catalyst component, and a polymer electrolyte, and is an anode catalyst layer in which oxidation of hydrogen progresses, and is disposed on one side of the polymer electrolyte membrane 30. The catalyst layer 33 includes a catalyst component, electrically conductive catalyst carriers which carry the catalyst component, and a polymer electrolyte, is a cathode catalyst layer in which reduction of oxygen progresses, and is disposed on the other side of the polymer electrolyte membrane 30.

The polymer electrolyte membrane 30 functions to cause protons generated in the catalyst layer 32 to be selectively transmitted to the catalyst layer 33, and functions as a barrier wall to separate a fuel gas supplied to an anode side thereof and an oxidizer gas supplied to a cathode side thereof.

The gas diffusion layer 35 is an anode gas diffusion layer serving to diffuse the fuel gas supplied to the anode side and is positioned between the separator 50 and the catalyst layer 32. The gas diffusion layer 36 is a cathode gas diffusion layer serving to diffuse the oxidizer gas supplied to the cathode side and is positioned between the separator 55 and the catalyst layer 33.

The gaskets 40 and 45 are frame-shaped and disposed respectively on both surfaces of an outer circumference portion of the polymer electrolyte membrane 30, as shown in FIG. 2. The gasket 40 is positioned to surround the catalyst layer 32, and functions to prevent the fuel gas supplied to the catalyst layer 32 from leaking externally. The gasket 45 is positioned to surround the catalyst layer 33, and functions to prevent the oxidizer gas supplied to the catalyst layer 33 from leaking externally.

The separators 50 and 55 function to electrically connect the unit cells 10 to each other in series and function as a barrier wall to separate the fuel gas, the oxidizer gas, and the coolant from each other, and they have substantially the same shape as the membrane electrode assembly 20, and for example, are formed by press working a stainless steel sheet. The stainless steel sheet is preferable in that a complicated machine work is easily performed and electrical conductivity is high, and a coating for corrosion resistance may be applied to it, as necessary.

The separator 50 is an anode separator disposed on the anode side of the membrane electrode assembly 20, faces the catalyst layer 32, and has a recess 52 constituting a gas passage which is positioned between the membrane electrode assembly 20 and the separator 50. The recess (gas passage)—52 is used for supplying the fuel gas to the catalyst layer 32.

The separator 55 is a cathode separator disposed on the cathode side of the membrane electrode assembly 20, faces the catalyst layer 33, and has a recess 57 constituting a gas passage which is positioned between the membrane electrode assembly 20 and the separator 55. The recess (gas passage) 57 is used for supplying the oxidizer gas to the catalyst layer 33.

Next, the material, the size, and the like of each constituent member will be described in detail.

As the polymer electrolyte membrane 30, a fluorine system polymer electrolyte membrane constituted by a perfluoro carbon sulfonic acid-based polymer, a hydrocarbon-based resin film having a sulfonic acid group, and a porous film which is impregnated with an electrolyte component such as phosphoric acid or ionic liquid may be applied. The perfluoro carbon sulfonic acid-based polymer may be Nafion (trademark, product made by Dupont Co., Ltd.), Aciplex (trademark, product made by Ashahi Kasei Co., Ltd.), or Flemion (trademark, product made by Ashahi Glass Co., Ltd.), for example. The porous film is formed from polytetrafluoroethylene (PTFE) or polyvinylidene fluoride (PVDF).

The thickness of the polymer electrolyte membrane 30 is not particularly limited, but preferably in a range of 5 μm to 300 and more preferably in a range of 10 μm to 200 μm in view of strength, durability, and output characteristics.

The catalyst component used in the catalyst layer (cathode catalyst layer) 35 is not particularly limited as long as the catalyst component performs catalytic action in the reduction of oxygen. The catalyst component used in the catalyst layer (anode catalyst layer) 34 is not particularly limited as long as the catalyst component has catalytic action in the oxidation of hydrogen.

The specific catalyst component is selected from metals such as platinum, ruthenium, iridium, rhodium, palladium, osmium, tungsten, lead, iron, chrome, cobalt, nickel, manganese, vanadium, molybdenum, gallium, and aluminum, or alloys thereof, for example. The catalyst component preferably includes at least platinum in order to improve catalytic activity, poisoning resistance to carbon monoxide and the like, thermal resistance, and the like. It is not necessary that the catalyst components applied in the cathode catalyst layer and the anode catalyst layer be the same, and the catalyst components may be appropriately differentiated.

The electrically conductive catalyst carrier used in the catalyst layers 32 and 33 is not particularly limited as long as the electrically conductive catalyst carrier has a specific surface area for carrying the catalyst component in a desired diffusion state, and sufficient electron conductivity as a current collector, but the main component is preferably carbon particles. The carbon particles are formed from carbon black, activated carbon, coke, natural graphite, or artificial graphite, for example.

The polymer electrolyte used in the catalyst layers 32 and 33 is not particularly limited as long as the polymer electrolyte is a material which has at least high proton conductivity, and for example, a fluorine-based electrolyte including fluorine atoms in the entirety or a part of a polymer skeleton, or a hydrocarbon-based electrolyte not including fluorine atoms in a polymer skeleton may be applied. The polymer electrolyte used in the catalyst layers 32 and 33 may be the same as or different from a polymer electrolyte used in the polymer electrolyte membrane 30, but preferably the same in view of improving adhesion of the catalyst layers 32 and 33 to the polymer electrolyte membrane 30.

The gas diffusion layers 35 and 36 are formed by using as a base a sheet-shaped material which has electrical conductivity and a porous property such as a carbon-made textile such as a glassy carbon, a sheet-like paper body, felt, or non-woven fabric. The thickness of the base is not particularly limited, but preferably in a range of 30 μm to 500 μm in view of mechanical strength and permeability to gas, water, or the like. In the gas diffusion layers 35 and 36, the base preferably includes a water repellent in view of water repellency and suppression of the flooding phenomenon. The water repellent may be, for example, a fluorine-based polymer material such as PTFE, PVDF, polyhexafluoropropylene, or tetrafluoroethylene-hexafluoropropylene copolymer (FEP), and polypropylene, polyethylene.

The gaskets 40 and 45 are formed from rubber material, a fluorine-based polymer material, or thermoplastic resin, for example. The rubber material may be fluorine rubber, silicon rubber, ethylene propylene rubber (EPDM), polyisobutylene rubber, or the like. The fluorine-based polymer material may be PTFE, PVDF, polyhexafluoropropylene, FEP, or the like. The thermoplastic resin may be polyolefin or polyester. Polyester may be, for example, polyethylene naphthalate (PEN). The thickness of the gaskets 40 and 45 is not particularly limited, but preferably in a range of 50 μm to 2 mm, and more preferably in a range of 100 μm to 1 mm.

The separators 50 and 55 are not limited to the embodiment formed from stainless steel, and other metal materials (for example, aluminum or clad material) and carbon such as dense carbon graphite are also applicable. Recesses 52 and 72 may be formed by means of, for example, a cutting process in a case where carbon is applied.

Next, a holding apparatus which is applied in order to handle the membrane electrode assembly 20 will be described.

Figure 3:
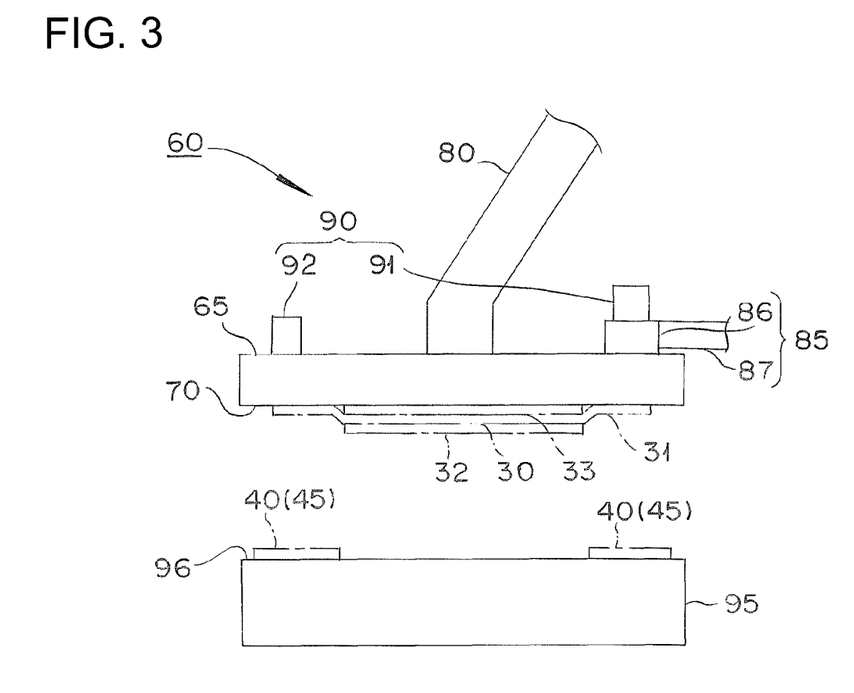
FIG. 3 is a side view illustrating a holding apparatus for fuel cell electrolyte membrane according to the embodiment of the present invention.
Figure 4:
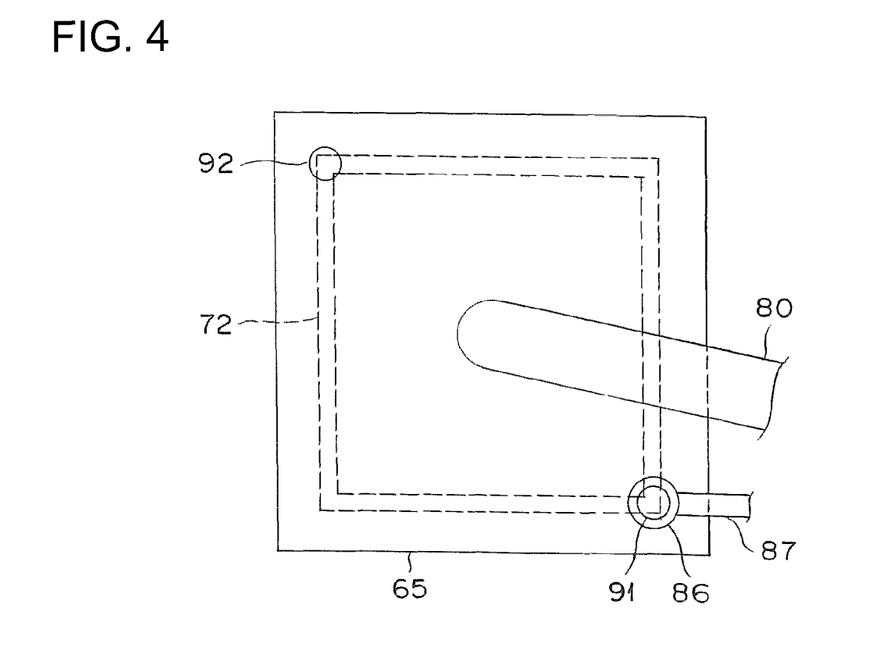
FIG. 4 is a plan view illustrating a support shown in FIG. 3.
Figure 5:
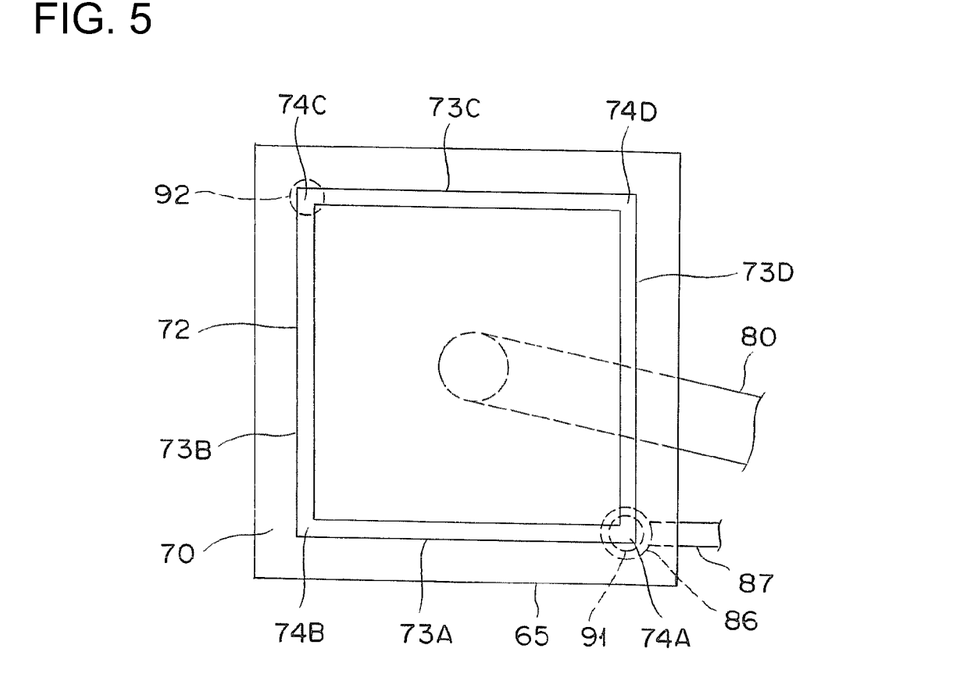
FIG. 5 is a bottom view illustrating the support shown in FIG. 3.
Figure 6:
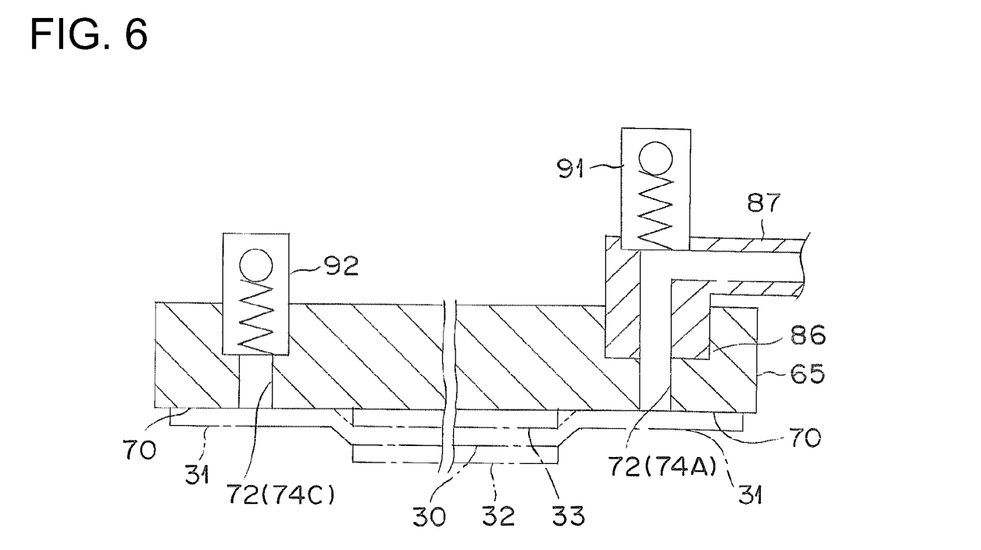
FIG. 6 is a cross-sectional view illustrating the support shown in FIG. 3.
Figure 7:
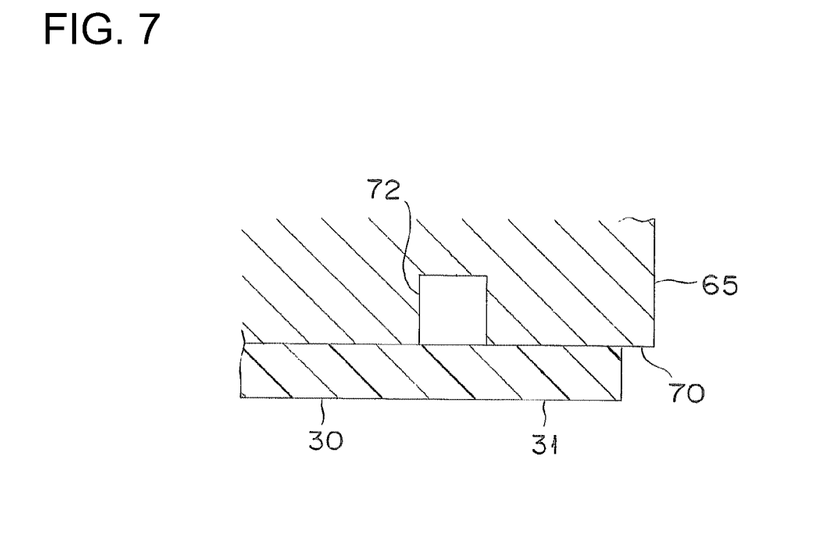
FIG. 7 is a cross-sectional view illustrating a recess shown in FIG. 5.

FIG. 3 is a side view illustrating the holding apparatus for fuel cell electrolyte membrane according to the embodiment of the present invention, and FIGS. 4, 5, and 6 are a plan view, a bottom view, and a cross-sectional view respectively illustrating a support shown in FIG. 3, and FIG. 7 is a cross-sectional view illustrating a recess shown in FIG. 5.

A holding apparatus 60 shown in FIG. 3 is used for disposing the gaskets 40 and 45 on both surfaces of the polymer electrolyte membrane 20 and includes a support 65, a transport device 80, an air-sucking section 85, and a clogging detecting device 90.

The support 65 has a flat surface part 70 which attracts the polymer electrolyte membrane 30 on which the catalyst layers 32 and 33 are respectively disposed, as shown in FIG. 5. The flat surface part 70 has a recess 72 connected to the air-sucking section 85. An embodiment in which the catalyst layer is disposed on only one surface may be applied to the polymer electrolyte membrane 30 attracted to the flat surface part 70.

The recess 72 has an inverted U shape in cross section (see FIG. 7), is in a frame shape which has straight portions 73A to 73D and bent portions 74A to 74D, and is positioned outside the outer circumferences of the catalyst layers 32 and 33 disposed on the polymer electrolyte membrane 30. Accordingly, the outer circumference 31 of the polymer electrolyte membrane 30 is attracted by sucking air in the recess 72.

The transport device 80 (see FIG. 3) is composed of a multi-axis robot hand, for example, and used for transporting the support 65 such that an outer circumference 31 of the polymer electrolyte membrane 30 on which the catalyst layers 32 and 33 are disposed is stacked on the gasket 40 (45). The gasket 40 (45) is disposed on a flat surface part 96 of a fixed type mounting table 95, for example. In this case, the polymer electrolyte membrane 30 is easily positioned, compared with an embodiment in which the mounting table 95 is moving. The flat surface part 96 is formed from, for example, a porous member, connected to an external vacuum source (not illustrated), and thus is adapted to be able to suck the gasket 40 (45).

The polymer electrolyte membrane 30 stacked on the gasket 40 is subsequently reversed and then stacked. Thus, the polymer electrolyte membrane 30 of which the gaskets 40 and 45 are disposed on both surfaces of the outer circumference portion is obtained.

The polymer electrolyte membrane 30 is attracted to the recess 72 disposed on the flat surface part 70 of the support 65, as described above, and thus the formation of wrinkles in the polymer electrolyte membrane 30 is prevented. Since the recess 72 is in a frame shape, and is positioned outside the outer circumference of the catalyst layers 32 and 33, the catalyst layers 32 and 33 are not directly sucked, and even though the catalyst particles detached from the catalyst layer are sucked, the polymer electrolyte membrane 30 is not attracted by means of suction holes and thus clogging is suppressed, and a reduction in production efficiency is prevented, compared with an embodiment in which a porous substrate (attracting holes) having a possibility that clogging occurs in many suction holes is used. Accordingly, it is possible to provide the holding apparatus for fuel cell electrolyte membrane capable of having high production efficiency.

Suction by the recess 72 is also preferable in that a suction pressure is released instantaneously, compared with a case where suction is performed through the porous substrate having many suction holes, and thus it is possible to improve production efficiency. Furthermore, even though the contamination is generated due to suction of particulates floating in the atmosphere, particulates adhering to the polymer electrolyte membrane 30, and the like, the occurrence of clogging is also suppressed.

The transport device 80 is not limited to the embodiment in which the multi-axis robot hand is used, and for example, may be configured by combining a plurality of linear actuators. In this case, a driving source is preferably a servo motor which has good controllability and is electrically synchronization-controlled. The transport device 80 may also be omitted by providing the mounting table 95 with a transport device. In this case, by the transport device provided in the mounting table 95, the mounting table 95 is transported toward the polymer electrolyte membrane 30 attracted to the support 65 which is fixedly disposed, and then the mounting table 95 is positioned such that the outer circumference 31 of the polymer electrolyte membrane 30 is stacked on the gasket 40 (45) disposed on the flat surface part 96 of the mounting table 95.

The air-sucking section 85 includes a manifold 86 and a piping system 87, as shown in FIGS. 4 to 6. The manifold 86 is composed of, for example, the suction valve, and is positioned at the bent portion 74A of the recess 72, and communicates with the recess 72.

The recess 72 has an inverted U shape (see FIG. 7) in cross section, and thus the manifold 86 can be easily connected thereto.

Since the recess 72 is in a frame shape although the manifold 86 (air-sucking section 85) is disposed in the bent portion 74A of the recess 72, resistance at sucking air decreases, and fluctuation in pressure at attracting the gasket 40 (45) decreases. Accordingly, formation of wrinkles in the polymer electrolyte membrane 30 is further suppressed.

The clogging detecting device 90 includes differential pressure gauges 91 and 92, as clearly shown in FIG. 6. The differential pressure gauges 91 and 92 are, for example, an elastic element type and are used for detecting pressure when the air-sucking section 85 (manifold 86 and piping system 87) sucks air. The differential pressure gauge 91 is disposed over the manifold 86, and the differential pressure gauge 92 is disposed on the bent portion 74C which is positioned on a diagonal line of the differential pressure gauge 91.

Accordingly, in a case where a partial clogging occurs in an air passage, pressure loss is caused at a clogged part at the time of pressure fluctuation, and a response to the pressure fluctuation is delayed. Thus, a time zone in which detection values of the differential pressure gauges 91 and 92 become different is generated. That is, pressure variation due to clogging of the recess 72 can be detected based on the detection values of the differential pressure gauges 91 and 92, and thus it is possible to detect clogging of the recess 72 at an early stage.

For example, at the time of starting suction, it is determined that the manifold 86 is in a normal state and the clogging does not occur when differential pressure does not occur in either of the differential pressure gauges 91 and 92, and it is determined that the clogging occurs in the manifold 86 when differential pressure occurs in only the differential pressure gauge 91. In a time period when the polymer electrolyte membrane 30 is sucked and held, it is determined that the recess 72 is in a normal state when differential pressure occurs in both the differential pressure gauges 91 and 92, and it is determined that the clogging occurs in the recess 72 when differential pressure occurs in only the differential pressure gauge 91. At the time when suction of the polymer electrolyte membrane 30 is stopped and released, and the polymer electrolyte membrane 30 is stacked and attached, it is determined that the recess 72 and the manifold 86 are in a normal state, and the clogging does not occur when differential pressure does not occur in either of the differential pressure gauges 91 and 92, and it is determined that the clogging occurs in the recess 72 when differential pressure occurs in the differential pressure gauge 91, and it is determined that the clogging occurs in the manifold 86 when differential pressure occurs in the differential pressure gauge 92.

Since the recess 72 is in a frame shape, locations where the clogging easily occurs are the bent portions 74B and 74D. However, when the clogging occurs in one of the bent portions 74B and 74D, a passage in the other of the bent portions 74B and 74D functions as a bypass passage, and thus poor attraction (poor holding) of the polymer electrolyte membrane 30 is suppressed. When the clogging occurs in both the bent portions 74B and 74D, it is possible to rapidly determine clogging at an early stage by using the differential pressure gauges 91 and 92.

In the embodiment in which the porous substrate (attracting holes) having many suction holes is used, it is needed that the number of pressure detecting devices corresponds to the number of the suction holes when the clogging is detected with respect to each suction hole, but installation of the pressure detecting devices is impossible considering the size of the polymer electrolyte membrane 30. Even if the installation is performed, the devices become complex, and maintenance control becomes complex. When cloggings in many suction holes are collectively detected by the pressure detecting device over the upstream part of the manifold, there is a concern that partial clogging cannot be appropriately detected. Meanwhile, a suction line of air according to the present embodiment is preferable in that malfunction due to clogging of the recess 72 will not be missed because the suction line of air is formed from the recess 72, and partial clogging is unlikely to be caused, and the suction line of air is adapted to detect an abnormality in the recess 72 with the necessary minimum number of devices, that is, two pressure detecting devices. The sucking force (holding force) of the support 65 as a holding jig to the polymer electrolyte membrane 30 is desired to be smaller than the deformation stress of the polymer electrolyte membrane 30, and a plurality of the recesses may be provided, but stress due to suction in at least one of the recesses is desirable to be smaller than the deformation stress of the polymer electrolyte membrane 30 in an inward direction of the recess.

Figure 8:
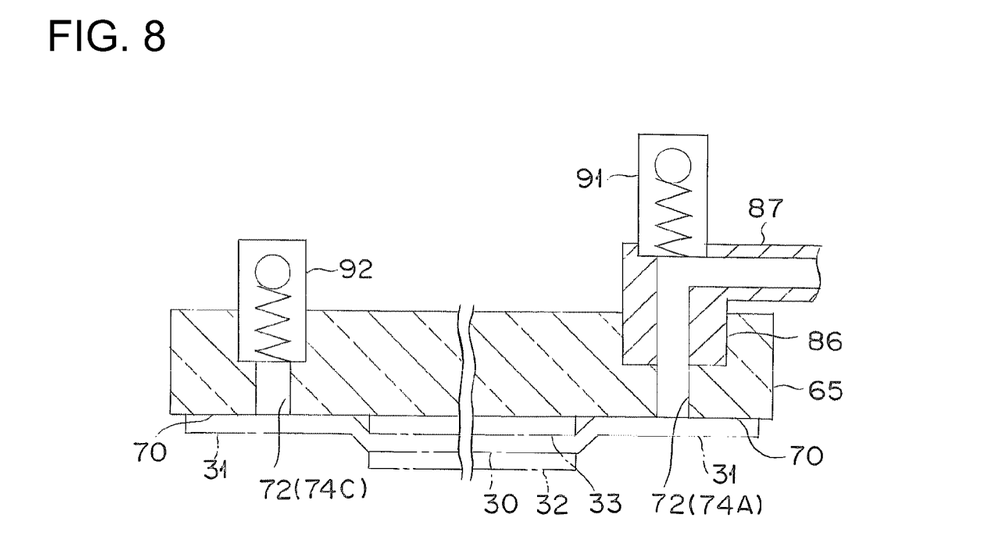
FIG. 8 is a cross-sectional view illustrating Modification 1 according to the embodiment of the present invention.

FIG. 8 is a cross-sectional view illustrating Modification 1 according to the embodiment of the present invention.

The support 65 is preferably formed from an optically transparent material as shown in FIG. 8. The optically transparent material is acrylic resin, for example.

In this case, states of the recess 72, the polymer electrolyte membrane 30, and the catalyst layers 32 and 33 may be optically detected. Accordingly, for example, it is possible to easily detect a clogging location by visually observing a state of the outer circumference 31 of the polymer electrolyte membrane 30 (situation of attraction). For example, when the outer circumference 31 of the polymer electrolyte membrane 30 is placed on the frame-shaped gasket 40 (45), it is possible to visually confirm the position of the polymer electrolyte membrane 30, the catalyst layers 32 and 33, and the gasket 40 (45), and thus positioning depending on perception of an operator is unnecessary, and reliability is improved. Furthermore, for example, it is possible to confirm the position by using an infrared sensor, and facilities are easily automated (used as a constituent of production facilities) based on the work by the robot or the like.

Figure 9:
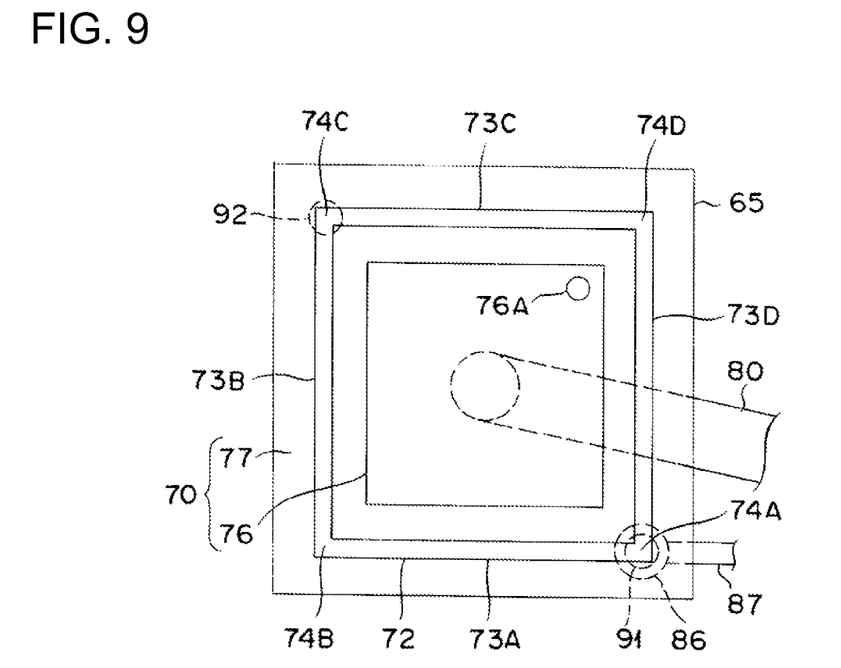
FIG. 9 is a bottom view illustrating Modification 2 according to the embodiment of the present invention.
Figure 10:
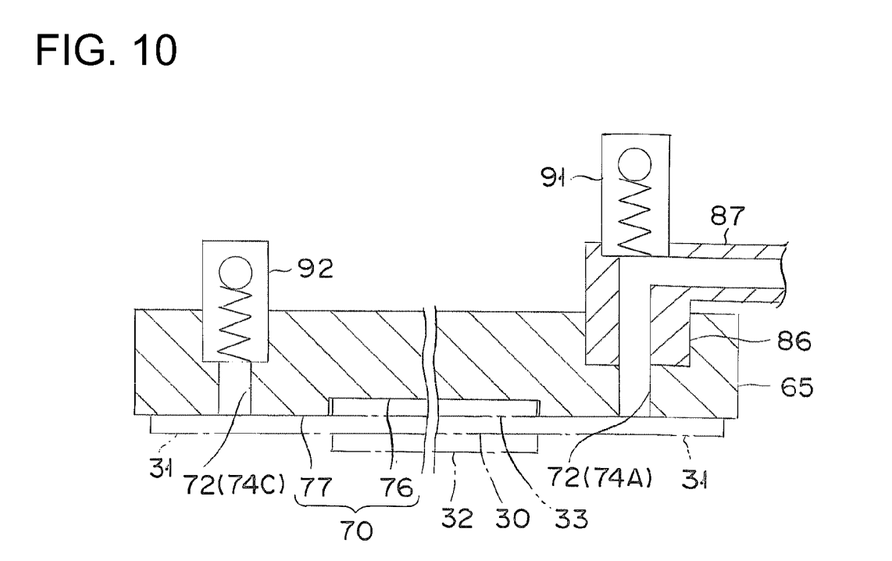
FIG. 10 is a cross-sectional view illustrating Modification 2 according to the embodiment of the present invention.

FIGS. 9 and 10 are a bottom view and a cross-sectional view illustrating Modification 2 according to the embodiment of the present invention.

It is preferable that a depressed portion 76 be disposed on the flat surface part 70 of the support 65 in order to suppress contamination of the catalyst particles detached from the catalyst layer 33 that is disposed on the polymer electrolyte membrane 30, as shown in FIGS. 9 and 10.

The depressed portion 76 has a substantially rectangular shape corresponding to a planar shape of the catalyst layers 32 and 33, and the depth thereof substantially matches the thickness of the catalyst layers 32 and 33, and thus the depressed portion 76 is set such that unintended distortion does not occur in the polymer electrolyte membrane 30. A frame-shaped portion 77 is disposed around the depressed portion 76. The recess 72 is disposed in a frame-shaped portion 77 and the frame-shaped portion 77 constitutes an attracting surface of the outer circumference 31 of the polymer electrolyte membrane 30. A through hole 76A may be provided in the depressed portion 76 in order to release the air when the polymer electrolyte membrane 30 on the support 65 as the holding jig approaches the gasket so as to come into contact with the gasket.

Since the depressed portion 76 forms a step between the recess 72 and the catalyst layer 33, it becomes difficult that the catalyst particles detached from the catalyst layer 33 move to the recess 72, and clogging due to the catalyst particles is suppressed. The manifold 86 is preferably provided so as not to interfere with the depressed portion 76.

Figure 11:
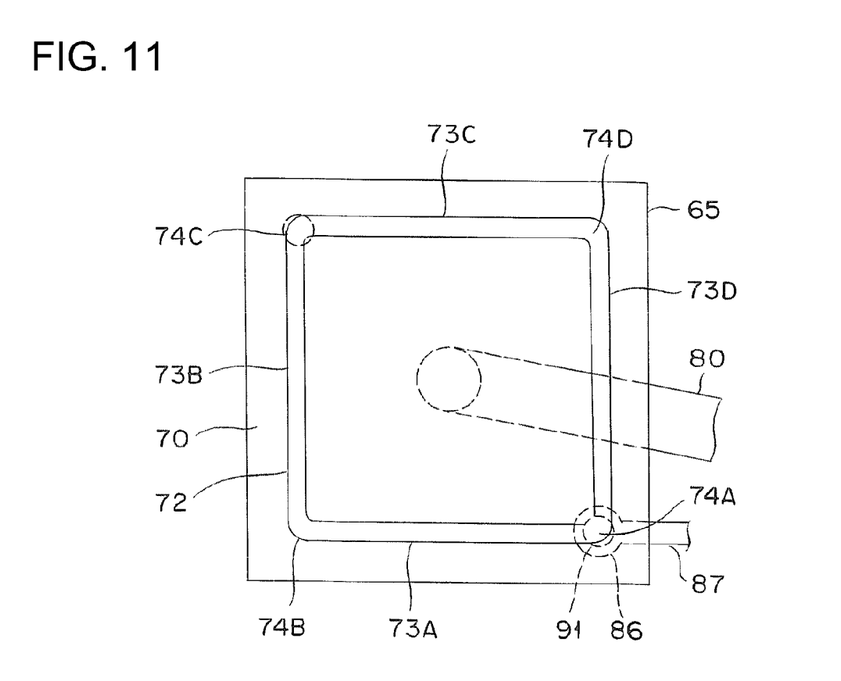
FIG. 11 is a bottom view illustrating Modification 3 according to the embodiment of the present invention.

FIG. 11 is a bottom view illustrating Modification 3 according to the embodiment of the present invention.

The bent portions 74A to 74D of the recess 72 are not limited to a substantially square shape and may have a curved shape which is gradually bent. In this case, air flows smoothly in the bent portions 74A to 74D, and thus resistance at sucking air decreases.

Figure 12:
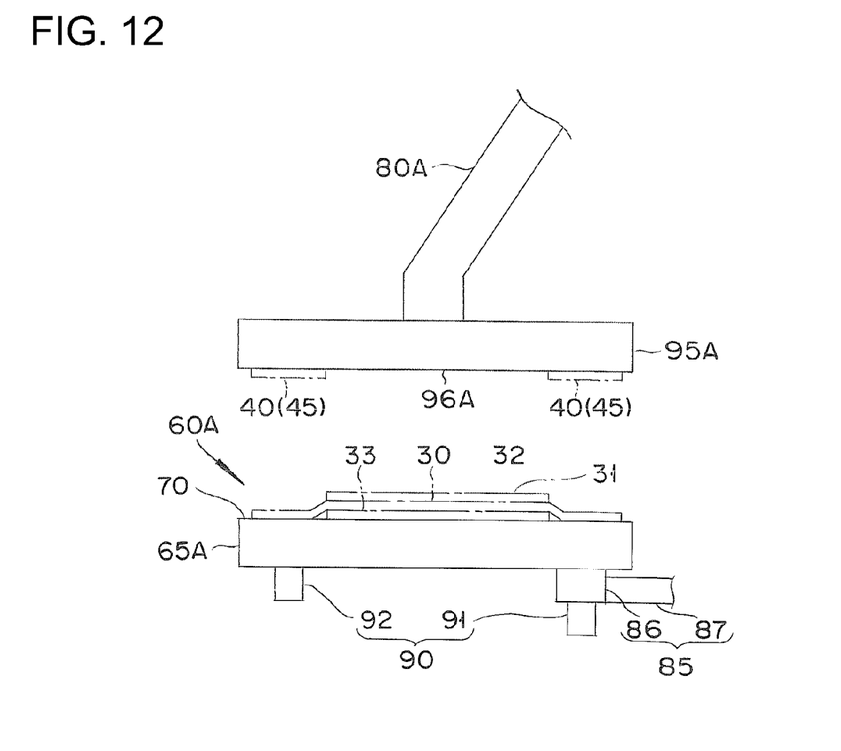
FIG. 12 is a side view illustrating Modification 4 according to the embodiment of the present invention.

FIG. 12 is a side view illustrating Modification 4 according to the embodiment of the present invention.

The electrolyte membrane 30 is not limited to the embodiment in which the electrolyte membrane 30 is supported downwardly, but the electrolyte membrane 30 may be disposed (placed) upwardly on the flat surface part 70 of a fixed support 65A, as in a holding apparatus 60A shown in FIG. 12. In this case, the gasket 40 (45) is downwardly supported by being attracted to a flat surface part 96A of a support 95A disposed upwardly, and transported by a transport device 80A connected to the support 95A, and positioned so as to be stacked on the outer circumference 31 of the polymer electrolyte membrane 30.

As described above, in the embodiment of the present invention, the electrolyte membrane is attracted to the recess disposed on the flat surface part of the support, and thus formation of wrinkles in the electrolyte membrane is prevented. Further, since the recess is in a frame shape and positioned outside the outer circumference of the catalyst layer, the catalyst layer is not directly sucked, and it is possible to suppress the occurrence of clogging, and to suppress a reduction in production efficiency. Accordingly, it is possible to provide a holding apparatus for fuel cell electrolyte membrane capable of having high production efficiency.

The recess is in a frame shape, but the manifold (air-sucking section) is disposed in the bent portion of the recess, and resistance at sucking air decreases, and fluctuation in pressure at attracting the polymer electrolyte membrane decreases, and accordingly, formation of wrinkles in the polymer electrolyte membrane is further suppressed.

When the support is formed from an optically transparent material, states of the recess, the polymer electrolyte membrane, and the catalyst layer may be visually detected. Accordingly, for example, it is possible to easily detect a clogging location by visually observing a state of the outer circumference of the polymer electrolyte membrane (situation of attraction). Further, for example, the positions of the polymer electrolyte membrane, the catalyst layer and the gasket can be visually confirmed when the outer circumference of the polymer electrolyte membrane is placed on the frame-shaped gasket. Accordingly, positioning depending on perception of an operator is unnecessary, and reliability is improved. Furthermore, for example, it is possible to confirm the position by using an infrared sensor, and facilities are easily automated (used as a constituent of production facilities) based on the work by the robot or the like.

In a case with the detecting device which detects pressure at sucking air, pressure variation due to the clogging of the recess can be detected, and thus it is possible to detect the clogging of the recess at an early stage.

When the recess has a U shape in cross section, it is possible to be easily connected to the manifold (air-sucking section).

In a case with the transport device which transports the support, positioning of the polymer electrolyte membrane is easily performed, compared with a case where the mounting table with the flat surface part on which the gasket is disposed is transported.

The present invention is not limited to the above embodiment, but can be modified in various forms within the range of the claims. For example, the fuel cell may be composed of a polymer electrolyte fuel cell which uses methanol as a fuel, or may be applied as a stationary power source. The polymer electrolyte fuel cell which uses methanol as a fuel may be a direct methanol fuel cell (DMFC), a micro fuel cell (passive type DMFC)), or the like. Ethanol, 1-propanol, 2-propanol, primary butanol, secondary butanol, tertiary butanol, dimethyl ether, diethyl ether, ethylene glycol, diethylene glycol, or the like may be applied as a material other than hydrogen and methanol.

The number of manifolds for communicating with the recess and sucking the air is not limited to one, and a plurality of manifolds may be disposed. The recess may be formed by a dual structure. Furthermore, Modifications 1 to 3 may be also combined in Modification 4.

The invention claimed is:

1. A holding apparatus for fuel cell electrolyte membrane comprising:
    a rectangular support having a flat surface configured to support an electrolyte membrane on which a catalyst layer is disposed, and which constitutes a membrane electrode assembly;
    one continuous recess formed in the flat surface, spaced from a periphery of the flat surface and formed along an entire periphery of the flat surface, the recess circumscribing a flat continuous central portion of the flat surface and located and configured such that an entire surface of the catalyst layer of the electrolyte membrane contacts the flat continuous central portion circumscribed by the recess during use but will not be exposed to the recess; and
    an air-sucking section positioned on the rectangular support on a side opposite the flat surface having the recess, the air-sucking section in communication with the recess through an opening between the recess and the air-sucking section, the recess configured to attract the electrolyte membrane surrounding the catalyst layer when the air-sucking section sucks air through the recess.

2. The holding apparatus for fuel cell electrolyte membrane according to claim 1, wherein the opening connecting the recess and the air-sucking section is positioned at a ninety-degree elbow of the recess.

3. The holding apparatus for fuel cell electrolyte membrane according to claim 1, wherein the support is formed from an optically transparent material.

4. The holding apparatus for fuel cell electrolyte membrane according to claim 1, further comprising a detecting device which detects clogging of the recess by detecting a pressure differential when air is sucked by the air-sucking section, the detecting device detecting a differential pressure between the air-sucking section and an elbow of the recess that is diagonally opposite from the opening for the air-sucking section.

5. The holding apparatus for fuel cell electrolyte membrane according to claim 1, wherein a cross-sectional shape of the recess is a U shape.

6. The holding apparatus for fuel cell electrolyte membrane according to claim 1, further comprising a transport device contacting the rectangular support on the side opposite the recess, which transports the rectangular support to a gasket holding part configured to hold a frame-shaped gasket, the transport device configured to move over the gasket holding part to position the electrolyte membrane on the frame-shaped gasket.

7. A holding apparatus for fuel cell electrolyte membrane comprising:
    a rectangular support having a flat surface configured to support an electrolyte membrane on which a catalyst layer is disposed, and which constitutes a membrane electrode assembly;
    one continuous recess formed in the flat surface, spaced from a periphery of the flat surface and formed along the flat surface, the recess located and configured such that an entire surface of the catalyst layer of the electrolyte membrane contacts a flat continuous central portion circumscribed by the recess during use but will not be exposed to the recess;
    an air-sucking section positioned on a surface of the rectangular support opposite the flat surface having the recess, the air-sucking section in communication with the recess through an opening between the recess and the air-sucking section, the recess configured to attract the electrolyte membrane surrounding the catalyst layer when the air-sucking section sucks air through the recess; and
    a detecting device which detects clogging of the recess by detecting a pressure differential when air is sucked by the air-sucking section, the detecting device detecting a differential pressure between the air-sucking section and an elbow of the recess that is diagonally opposite from the opening for the air-sucking section.

8. The holding apparatus for fuel cell electrolyte membrane according to claim 7, wherein the opening between the recess and the air-sucking section is positioned at an elbow of the recess.

9. The holding apparatus for fuel cell electrolyte membrane according to claim 7, wherein the support is formed from an optically transparent material.

10. The holding apparatus for fuel cell electrolyte membrane according to claim 7, wherein a cross-sectional shape of the recess is a U shape.

11. The holding apparatus for fuel cell electrolyte membrane according to claim 7, further comprising a transport device contacting the rectangular support on the side opposite the recess, which transports the rectangular support to a gasket holding part configured to hold a frame-shaped gasket, the transport device configured to move over the gasket holding part to position the electrolyte membrane on the frame-shaped gasket.

* * * * *